US012033768B2

(12) United States Patent
Kiselev

(10) Patent No.: US 12,033,768 B2
(45) Date of Patent: Jul. 9, 2024

(54) TARGET CARRIER ASSEMBLY AND IRRADIATION SYSTEM

(71) Applicant: Curium US LLC, St. Louis, MO (US)

(72) Inventor: Maxim Kiselev, Noblesville, IN (US)

(73) Assignee: Curium US LLC, St. Louis, MO (US)

( * ) Notice: Subject to any disclaimer, the term of this patent is extended or adjusted under 35 U.S.C. 154(b) by 482 days.

(21) Appl. No.: 17/303,126

(22) Filed: May 20, 2021

(65) Prior Publication Data

US 2022/0375643 A1 Nov. 24, 2022

(51) Int. Cl.

*G21K 1/02* (2006.01)
*G21G 1/10* (2006.01)
*G21K 5/08* (2006.01)
*H05H 6/00* (2006.01)
*H05H 13/00* (2006.01)

(52) U.S. Cl.

CPC ................. *G21K 1/02* (2013.01); *G21G 1/10* (2013.01); *G21K 5/08* (2013.01); *H05H 6/00* (2013.01); *H05H 13/005* (2013.01)

(58) Field of Classification Search

CPC .. G21K 1/02; G21K 5/08; G21G 1/10; H05H 6/00; H05H 13/005
USPC ....................................................... 250/505.1
See application file for complete search history.

(56) References Cited

U.S. PATENT DOCUMENTS 4,672,212 A 6/1987 Brahme
6,011,825 A * 1/2000 Welch ...................... G21G 1/10 376/195
9,103,925 B2 8/2015 Johnson et al.
9,711,251 B2 7/2017 Lee et al.
9,789,341 B2 10/2017 Abbasi
10,714,225 B2 7/2020 Ylimaki
2010/0027755 A1* 2/2010 Teodorescu .............. G21K 1/02 378/147
2019/0103198 A1* 4/2019 Nolen, Jr. .............. G21G 1/001
(Continued)

FOREIGN PATENT DOCUMENTS

EP 3000114 B1 5/2018
JP 2016145714 A 8/2016
(Continued)

OTHER PUBLICATIONS

International Search Report and Written Opinion of the International Searching Authority dated Oct. 18, 2022 in PCT/US2022/027815; pp. 1-19.

*Primary Examiner* — Michael Maskell
(74) *Attorney, Agent, or Firm* — Armstrong Teasdale LLP

(57) ABSTRACT

A target carrier assembly includes a housing, a target, and a collimator. The housing includes a collimator compartment and a target compartment divided by a vacuum window foil, the collimator being removably disposed within the collimator compartment, and the target being disposed within the target compartment. The collimator compartment is attached to a cyclotron beam line in the irradiation position, and the target compartment is in fluid communication with a cooling fluid supply line and a cooling fluid return line in the irradiation position. The target is cooled by the cooling fluid from the cooling fluid supply line. The collimator directs a particle beam from the cyclotron beam line to irradiate the target and includes a beam entry diameter and a beam exit diameter. The collimator is in thermal contact with the collimator compartment.

13 Claims, 6 Drawing Sheets

(56) References Cited

U.S. PATENT DOCUMENTS

| | | | |
|---|---|---|---|
| 2019/0221325 | A1 | 7/2019 | Schaffer et al. |
| 2020/0043621 | A1 | 2/2020 | Comor et al. |
| 2020/0305268 | A1 | 9/2020 | Uno et al. |

FOREIGN PATENT DOCUMENTS

| | | | |
|---|---|---|---|
| JP | 2018013465 | A | 1/2018 |
| WO | 2014186898 | A1 | 11/2014 |

* cited by examiner

TARGET CARRIER ASSEMBLY AND IRRADIATION SYSTEM

FIELD

The field relates generally to production of radioisotopes and, more particularly, to a target carrier assembly for use in systems and methods for preparing radioisotopes.

BACKGROUND

Radiopharmaceuticals, drugs that incorporate a radioactive element (e.g., a radioisotope), are typically used in nuclear medicine for diagnostic and/or therapeutic purposes. Radioisotopes may be produced by direct production (e.g., proton- or neutron-induced reactions using particle beams). In the production of at least some radioisotopes by an irradiation system, a target carrier may be used to move a target material into the irradiation system and out of the irradiation system as a radioisotope (e.g., after the target has been irradiated), such that the radioisotope may be safely retrieved. In these systems, at least some irradiated parts cannot be removed from the irradiation system. For example, collimators that guide the particle beam to the target material are not removed from the irradiation system like the target carrier is. Because maintenance and repairs cannot be carried out on irradiation systems that are "hot" (i.e., include high radiation levels from irradiated parts), there may be delays for maintenance and repairs of up to six months such that irradiated parts can "cool off" below a threshold radiation level. Accordingly, a need exists for methods and systems that facilitate removing all irradiated parts from an irradiation system to lower radiation levels, reduce personnel radiation exposure, and reduce the downtime required for irradiation system maintenance and repairs.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

In one aspect, a target carrier assembly for transferring a target to and from an irradiation position of an irradiation system includes a housing including a collimator compartment and a target compartment, a target, and a collimator. The collimator compartment includes an inner surface and an outer surface, and the collimator compartment and the target compartment are divided by a vacuum window foil. The collimator compartment is attached to a cyclotron beam line, and the target compartment is in fluid communication with a cooling fluid supply line and a cooling fluid return line in the irradiation position. The target is secured within the target compartment and cooled by a cooling fluid from the cooling fluid supply line. The collimator is removably mounted within the collimator compartment and disposed to direct a particle beam from the cyclotron beam line to irradiate the target. The collimator includes an entry diameter and an exit diameter, and the collimator is in thermal contact with the inner side of the collimator compartment.

In another aspect, a collimator included within a collimator compartment of a target carrier assembly of an irradiation system has a beam entry diameter, a beam exit diameter, an inner surface, and an outer surface. The beam entry diameter is greater than the exit diameter forming a narrowing channel disposed to direct a particle beam to irradiate a target included within the target carrier assembly. The inner surface of the collimator is curved such that an incidence angle between the particle beam and the inner surface of the collimator at the beam entry diameter is greater than an incidence angle between the particle beam and the inner surface of the collimator at the beam exit diameter.

In still another aspect, an irradiation system includes a cyclotron beam line for generating a particle beam and a target station for irradiating a target. The target station includes a housing, a target carrier assembly, a vertical conveyance system, and front and back clamps. The target carrier assembly includes the target and transfers the target to and from an irradiation position within the target station. The vertical conveyance system moves the target carrier assembly to and from the irradiation position. The front and back clamps secure the target carrier assembly in the irradiation position and provide water and vacuum attachments to the target carrier assembly.

In yet another aspect, a method for irradiating a target includes providing a reusable target carrier assembly, positioning the target carrier assembly in an irradiation position in a target station of an irradiation system using a vertical conveyance system, irradiating at least one target disposed within the target carrier assembly with a particle beam to produce a radioisotope, and removing, using the vertical conveyance system, the target carrier assembly from the irradiation position. The target carrier assembly includes a housing including a target compartment and a collimator compartment, at least one target disposed within the target compartment, and at least one collimator within the collimator compartment. The particle beam is directed at the at least one target by the at least one collimator.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Figure 1:
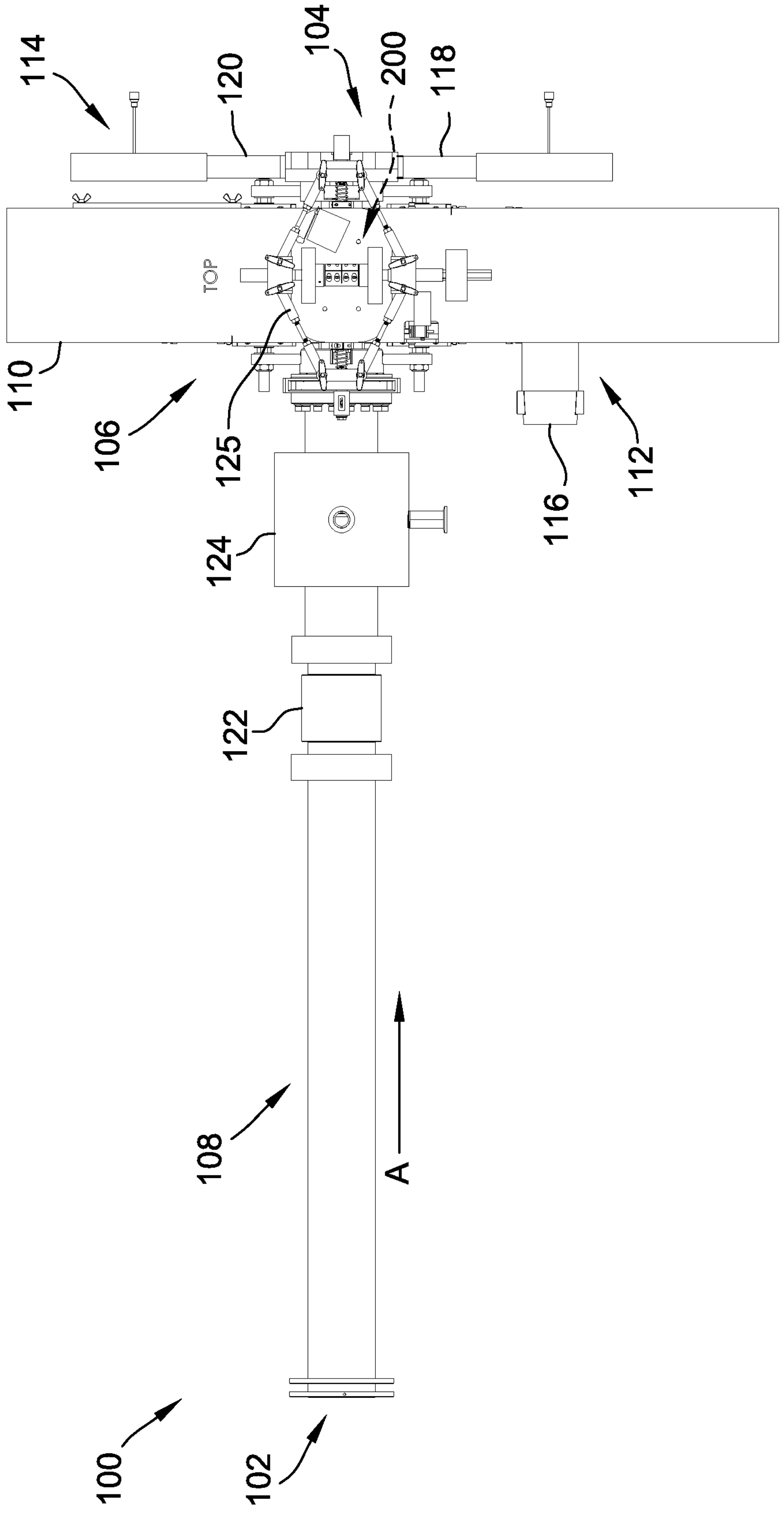
FIG. 1 is a side view of an example system for irradiating a target to generate a radioisotope.

FIG. 1 is a side view of an example irradiation system 100 for irradiating a target and generating a radioisotope. The system 100 may be used to irradiate a target material including, for example and without limitation, natural rubidium targets to generate and otherwise process various radioisotopes including, for example and without limitation, Sr-82. The system 100 spans from a beam entrance 102 to a side 104 opposite the beam entrance, and the system 100 generally includes a target station 106 and an evacuated cyclotron beam line 108. A target carrier assembly 200 (shown in FIG. 2A) is included within the target station 106 when the target carrier assembly 200 is in an irradiation position. A particle beam (e.g., low energy, 30 MeV proton beams or high energy, 70 MeV proton beams) is generated by a cyclotron (now shown) and passes from the cyclotron beam line 108 to the target station 106 in the direction of arrow A.

The irradiation system 100 is suitably located within a radiation room spanning vertically from a vault ceiling (not shown) to a floor (not shown). The target station 106 spans the vertical length of the room. That is, the target station 106 is bolted to the floor and penetrates through the vault ceiling. The target station 106 may terminate at a shielded chamber (not shown), also referred to as a "hot cell," located above the vault ceiling. In other embodiments, the irradiation system 100 and target station 106 may have any suitable configuration. For example, the hot cell may be located in a different part of the target station 106, or the hot cell may be separate from the target station 106.

The target station 106 includes a housing 110, a vertical conveyance system 112 (shown in FIG. 2B) disposed within the housing 110, and a cooling fluid supply 114. The vertical conveyance system 112 transfers the target carrier assembly 200 to and from the irradiation position in the target station 106 using a winch 116, as described below with respect to FIG. 2B.

The cooling fluid supply 114 includes a cooling fluid supply line 120 and a cooling fluid return line 118. The cooling fluid supply line 120 provides a cooling fluid to the target carrier assembly 200 when the target carrier assembly is in the irradiation position, and the cooling fluid return line 118 disposes of the cooling fluid after it has been supplied to the target carrier assembly 200, as described further herein. The cooling fluid supply 114 also provides compressed air to the target carrier assembly 200 through the cooling fluid supply line 120 and the cooling fluid return line 118. The compressed air supplied to the target carrier assembly 200 purges any radioactive cooling fluid from the target carrier assembly 200 such that the target carrier assembly 200 is not contaminated with radioactive cooling fluid when the target carrier assembly 200 moves out of the irradiation position.

The irradiation system 100 further includes bellows 122 and a cube 124 disposed between the cyclotron beam line 108 and the target station 106. The bellows 122 allow for freedom of movement of mechanically actuated clamps (e.g., front clamp 126, shown in FIG. 2A) that clamp the target carrier assembly 200 in the irradiation position using a screw jack mechanism 125, as further described with reference to FIG. 2A. The cube 124 provides a connection to a vacuum pump such that the target carrier assembly 200 has a vacuum-tight seal within the target station 106 when the target carrier assembly 200 is in the irradiation position, as described further herein.

Figure 2A:
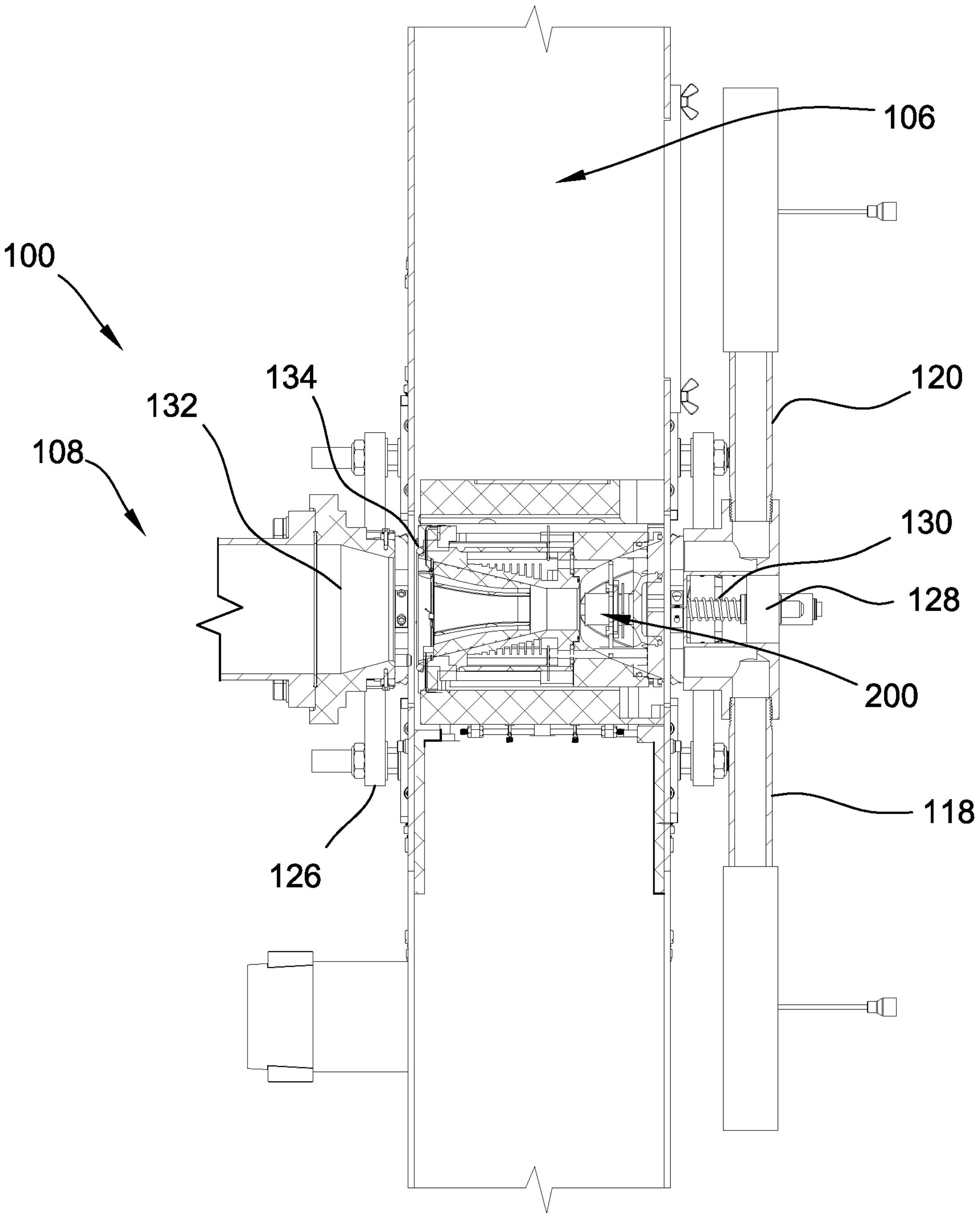
FIG. 2A is a cross-sectional view of the example system shown in FIG. 1.

FIG. 2A is a cross-sectional view of the system 100 showing the target carrier assembly 200 in the irradiation position in the target station 106. The target carrier assembly 200 is in the irradiation position when the target carrier assembly 200 is secured in place in the target station 106 and positioned to receive radiation from the particle beam. The target carrier assembly 200 may be lowered into the irradiation position by the vertical conveyance system 112 after the target 206 has been inserted into the target carrier assembly 200 such that a target material included within the target 206 can be irradiated by the particle beam.

The target carrier assembly 200 is secured in place by a front clamp 126 and a back clamp 128 of the target station 106. The clamps 126, 128 actuate simultaneously to both secure the target carrier assembly 200 in the irradiation position (e.g., by being propelled toward the target carrier assembly 200) and remove the target carrier assembly 200 from the irradiation position (e.g., by being propelled away from the target carrier assembly 200). The clamps 126, 128 are actuated using the screw jack mechanism 125 (shown in FIG. 1) including left- and right-handed screws. Screw jacks 130 actuate the clamps 126, 128 by pushing the clamps to an open position (e.g., retracting the clamps 126, 128) when the target carrier assembly 200 is removed from the irradiation position. When the front clamp 126 is closed, front clamp 126 drives a vacuum flange 132 into the target carrier assembly 200 such that an O-ring 134 creates a vacuum-tight seal between the target carrier assembly 200 and the vacuum flange 132. When the back clamp 128 is actuated, the back clamp 128 drives cooling fluid supply line 120 and cooling fluid return line 118 into the target carrier assembly 200. That is, when the back clamp 128 is actuated, the back clamp 128 drives cooling fluid supply line 120 into a cooling fluid supply channel of the target carrier assembly 200 and cooling fluid return line 118 into a cooling fluid return channel of the target carrier assembly 200. The target material of target carrier assembly 200 is cooled as the target material is irradiation by a cooling fluid from the cooling fluid supply line 120. The cooling fluid flows from the cooling fluid supply line 120, past the target material, and exits the target carrier assembly 200 through the cooling fluid return line 118.

The target carrier assembly 200 is moved from the irradiation position after the target material included within the target carrier assembly 200 is irradiated and a radioisotope has been generated. For example, the target carrier assembly 200 may be moved from the irradiation position to the hot cell. The hot cell may include a lead glass casing and master-slave manipulators such that the radioisotope can be safely retrieved from the target carrier assembly 200 by personnel (i.e., without exposing the personnel to high levels of radiation from the radioisotope), as described further herein.

Figure 2B:
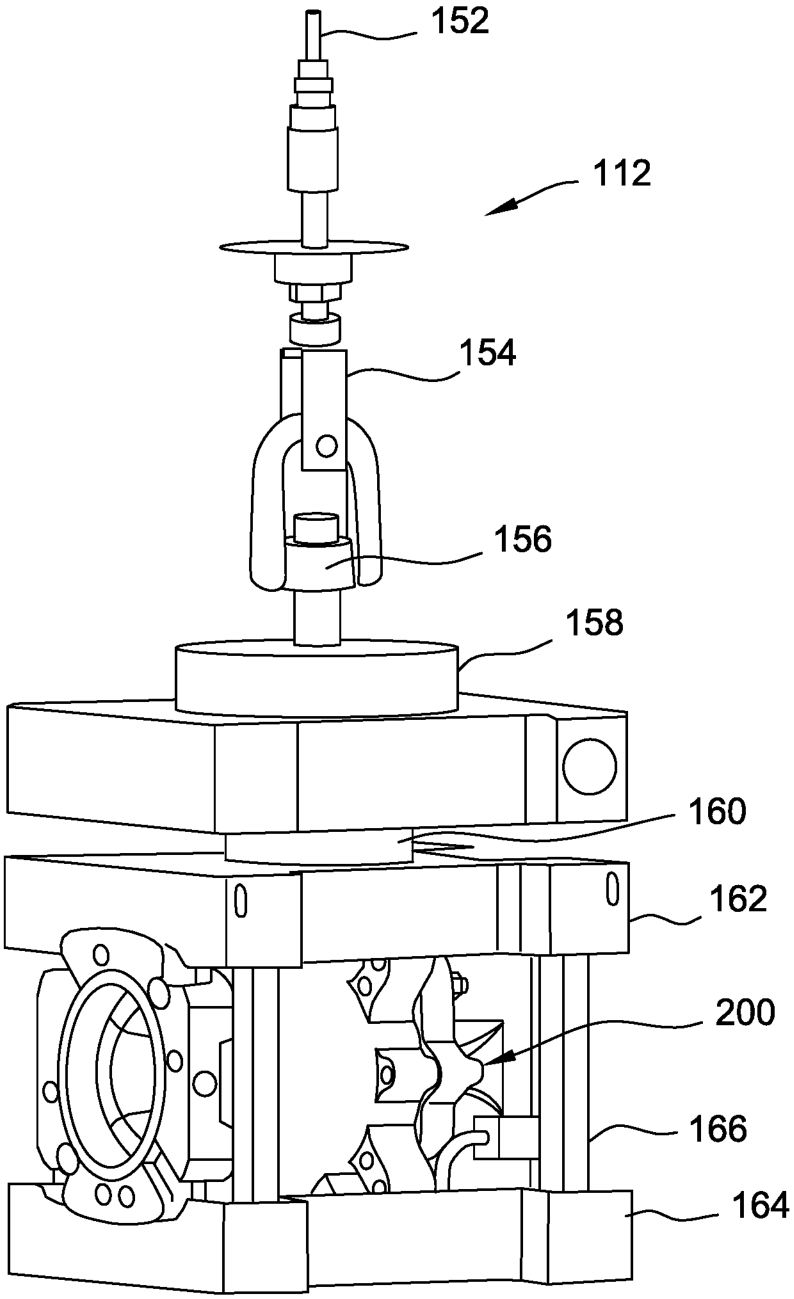
FIG. 2B is a schematic view of a mechanical conveyance system of the example system shown in FIG. 1.

FIG. 2B is a schematic view of the vertical conveyance system 112 of the system 100. The vertical conveyance system 112 includes a cable 152, and the cable 152 is attached to the winch 116 (shown in FIG. 1). The cable 152 may be a single cable 152 or a plurality of cables 152. The vertical conveyance system 112 includes a shackle 154, a swivel 156, a weight 158 to facilitate downward movement of the cable 152, and a magnet 160 (e.g., fabricated from a niodimium alloy) that magnetically and removably connects the cable 152 to the target carrier assembly 200. The winch 116 adjusts the length of the cable 152, when the cable 152 is magnetically coupled to the target carrier assembly 200, to move the target carrier assembly 200 into and out of the irradiation position.

In one embodiment, the magnet 160 connects to an upper plate 162 of the target carrier assembly 200. The upper plate 162 is fabricated from steel or a steel alloy. The target carrier assembly 200 further includes a lower plate 164 fabricated from a plastic and spacers 166 between the upper plate 162 and the lower plate 164.

Figure 3:
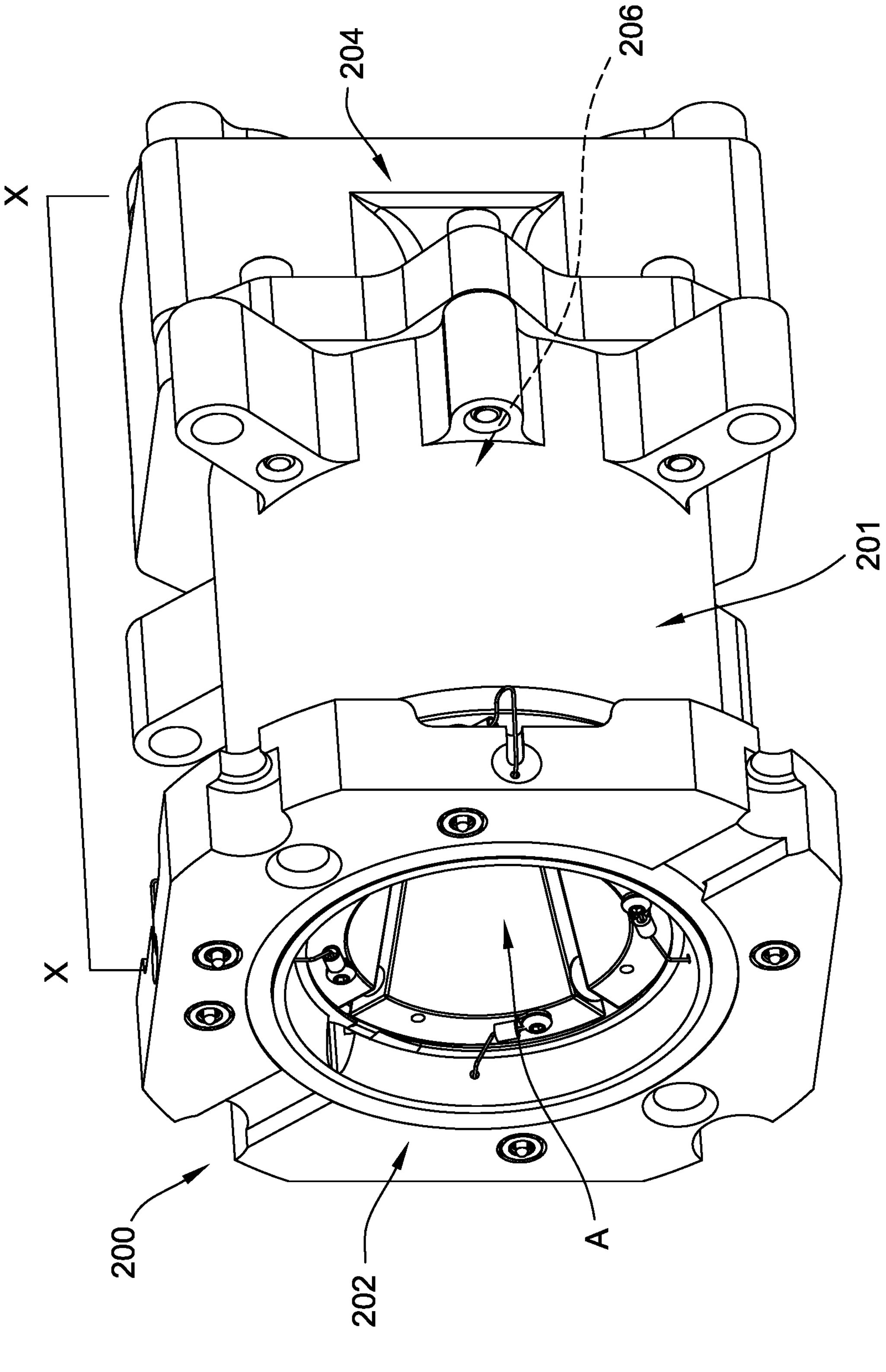
FIG. 3 is a perspective view of an example target carrier assembly suitable for use with the system of FIG. 1.
Figure 4:
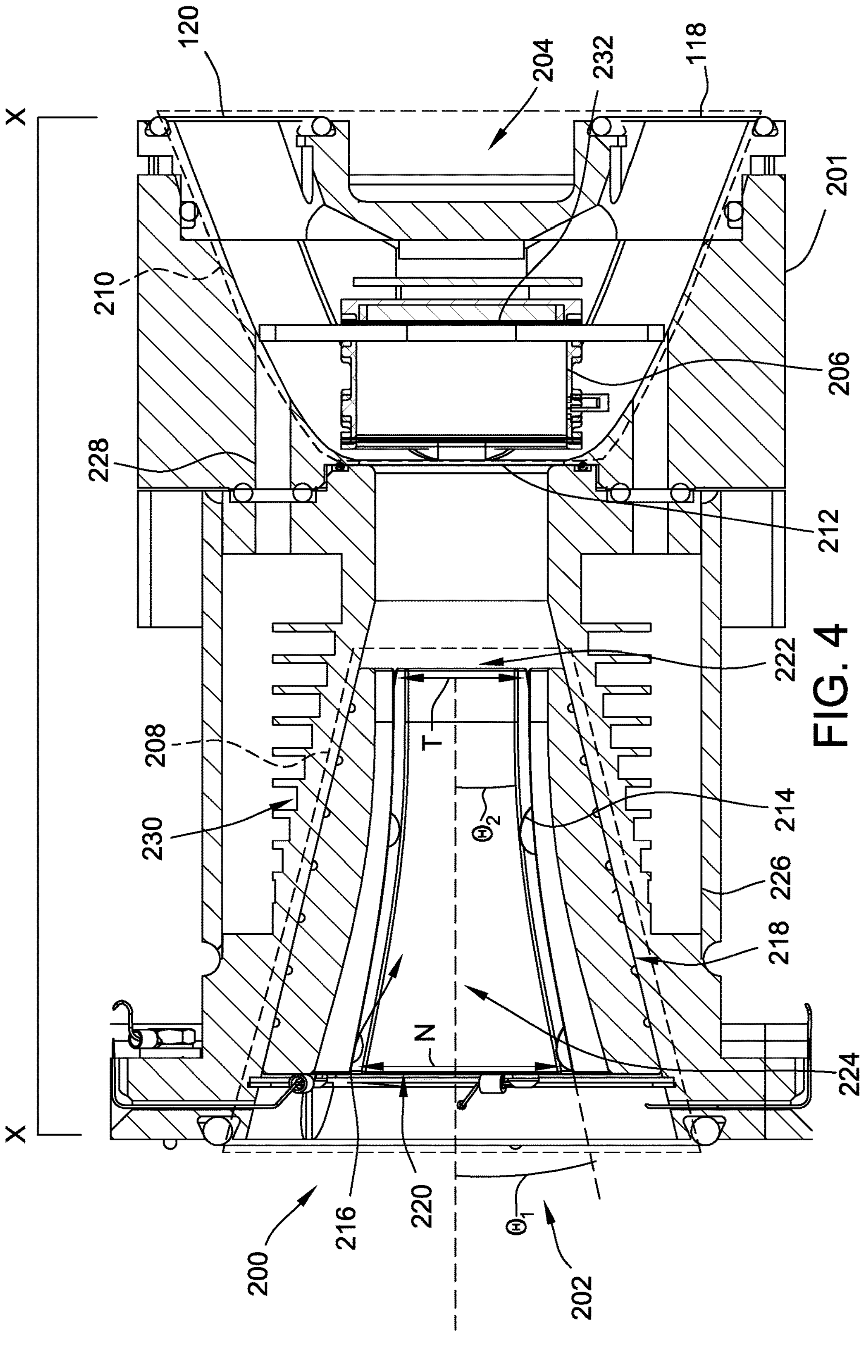
FIG. 4 is a cross-sectional view of the example target carrier assembly shown in FIG. 3 taken along line "X-X."
Figure 5:
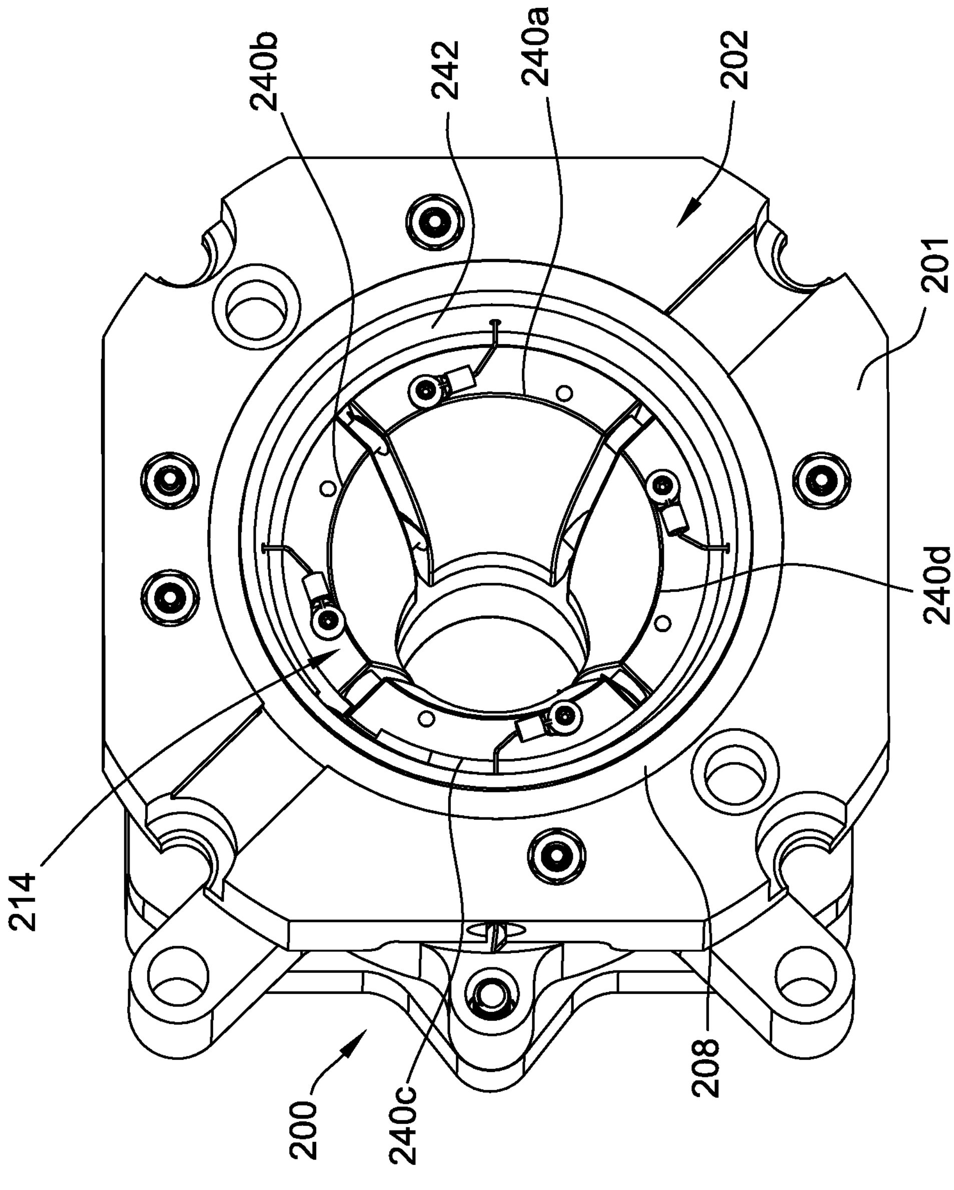
FIG. 5 is another perspective front view of the example target carrier assembly shown in FIG. 3.

FIGS. 3-5 illustrate various views of the target carrier assembly 200. FIG. 3 is a perspective side view of the target carrier assembly 200. FIG. 4 is a cross-sectional view of the target carrier assembly 200 taken along line "X-X" shown in FIG. 3. FIG. 5 is another perspective side view of the target carrier assembly 200.

Referring to FIG. 3, the target carrier assembly 200 includes a housing 201 and spans from a beam entry side 202 to a side 204 opposite the beam entry side 202. When the target carrier assembly 200 is in the irradiation position within the target station 106 and a target 206 (shown in FIG. 4) disposed within the target carrier assembly 200 is irradiated by a particle beam, the particle beam enters the target carrier assembly 200 at the beam entry side 202 and passes through the target carrier assembly 200 in the direction of arrow A.

Referring to FIG. 4, the target carrier assembly 200 includes a collimator compartment 208 and a target compartment 210. A vacuum window foil 212 is disposed between the collimator compartment 208 and the target compartment 210. The target 206 is disposed within the target compartment 210. When the target carrier assembly 200 is in the irradiation position, the collimator compartment 208 is attached to the cyclotron beam line 108 (shown in FIG. 2), and the target compartment 210 is attached to (i.e., in fluid communication with) the cooling fluid supply 114 (shown in FIG. 2). In the irradiation position, the target 206 is cooled by the cooling fluid supply 114 as the cooling fluid moves into the target carrier assembly 200 from the cooling fluid supply line 120, absorbs heat radiating from the target 206 as the cooling fluid moves past the target 206, and exits the target carrier assembly 200 through the cooling fluid return line 118.

A collimator 214 is removably disposed within the collimator compartment 208 to direct the particle beam to irradiate the target 206 in the target compartment 210. The collimator 214 includes an inner surface 216 and an outer surface 218, and the collimator 214 spans from a beam entry side 220 to a beam exit side 222. The beam entry side 220 has a beam entry diameter N, and the beam exit side 222 has a beam exit diameter T. The beam entry diameter N is larger than the beam exit diameter T such that the collimator 214 forms a narrowing channel 224 from the beam entry side 220 to the beam exit side 224. The inner surface 216 of the collimator 214 is curved such that an incidence angle $\theta_1$ between the inner surface 216 at the beam entry side 220 and the particle beam (shown as a dotted line through channel 224) is larger than an incidence angle $\theta_2$ between the inner surface 216 at the beam exit side 222 and the particle beam. For example, the incidence angle $\theta_1$ may be greater than 10° (e.g., 11°), and the incidence angle $\theta_2$ may be less than 5° (e.g., 3° or 4°). The varying incidence angles $\theta_1$ and $\theta_2$ of the collimator 214 minimize activation of the collimator 214 (e.g., radiating the collimator 214) because some particles that stray from the path of the particle beam and hit the inner surface 216 of the collimator 214 are deflected because of the low incidence angle.

Deviation of particles from an axis (e.g., the dotted line shown in FIG. 4) of the particle beam generally follows a normal distribution, with the number of particles diminishing as the distance from the beam axis increases. When encountering a surface of the collimator 214, a particle may be deflected or absorbed. A probability of a particle being deflected increases as the incidence angle of the collimator 214 decreases. For example, with an incidence angle of 90 degrees (the incidence angle commonly used in conventional collimators), nearly 100% of all particles are absorbed, leading to conventional collimators overheating and activation. By presenting a smaller incidence angle $\theta_2$ in the collimator 214 to particles closer to the beam axis where particles are more likely to hit, the number of particles that are deflected is increased, and the number of particles that are absorbed is decreased. Accordingly, particle loss from the particle beam is minimized by the collimator 214, and the fluence of the particle beam on the target 206 is therefore maximized by the collimator 214 while activation and heating of the collimator is minimized.

The outer surface 218 of the collimator 214 is in thermal contact with the collimator compartment 208, and the housing 201 of the target carrier assembly 200 is in thermal contact with the collimator compartment 208. The housing 201 includes a cooling fluid volume 226 adjacent to the collimator compartment 208. The cooling fluid volume 226 is connected to the cooling fluid supply line 120 by a channel 228. As the cooling fluid supply line 120 supplies cooling fluid to the target 206, some of the supplied cooling fluid flows through channel 228 to cooling fluid volume 226. The cooling fluid volume 226 includes a plurality of fins 230 thermally coupled to the collimator compartment 208. The fins 230 increase a surface area between the collimator compartment 208 and the fluid volume 226 to facilitate heat exchange between the collimator 214 and the cooling fluid within the fluid volume 226. The cooling fluid enters the fluid volume 226 through cooling fluid supply line 118, moves around collimator 214 and absorbs heat radiating from the collimator 214 as the particle beam passes through collimator 214, and exits the fluid volume 226 to the cooling fluid return line 118.

The target compartment 210 further includes a backing spacer 232 that secures target 206 in place within the target compartment 210 while allowing cooling fluid passage on a back side (e.g., a side adjacent opposite side 204) of the target 206. In some embodiments, the target compartment 210 may include one or more additional targets 206 placed behind the backing spacer 232 (i.e., placed behind the target 206 and toward the opposite side 204). In these embodiments, the targets 206 are placed in the target compartment 210 such that the particle beam enters and exits the first target 206, enters and exits an adjacent second target 206, etc. Accordingly, each target 206 absorbs radiation from the particle beam after the particle beam exits each previous target 206. Each target 206 includes a backing spacer 232 for holding the target 206 in place within the target compartment 210.

The housing 201, the collimator compartment 208, the target compartment 210, and the collimator 214 of the target carrier assembly 200 are fabricated from a pure aluminum metal or an aluminum alloy. The vacuum window foil is fabricated from HAVAR®, molybdenum, or similar high strength metal alloy. The target 206 is fabricated from INCONEL®, Monel, stainless steel, niobium, titanium, or another metal alloy compatible with target material, and a suitable target material (e.g., rubidium) is placed within the target 206 to produce an isotope after the target material is irradiated.

Referring now to FIG. 5, a side perspective view of the beam entry side of side 202 of the target carrier assembly 200 is illustrated to show and describe the collimator 214 in more detail. In this embodiment, the collimator 214 includes four electrically insulated segments **240*a-d* disposed around the circumference of the collimator compartment 208. In other embodiments, the collimator 214 may include any suitable number of segments 240, including, for example, two segments 240, three segments 240, five segments 240, etc. The segments 240 are electrically insulated through an anodizing process, and the segments 240, and therefore the collimator 214**, are fabricated from a pure aluminum or an aluminum alloy.

The segments 240*a-d*, and therefore the collimator 214, are removably coupled to the collimator compartment 208 with a retaining ring 242. That is, each of the segments 240 can be independently removed from the collimator housing 201 (e.g., to separate highly activated parts from bulky, less activated parts in order to minimize high level waste volume) when the retaining ring 242 is removed from the collimator compartment 208. For example, the retaining ring 242 and any and all segments 240 of the collimator 214 may be removed by a master-slave manipulator of the hot cell of the target station 106 (shown in FIG. 1), described above.

The segments 240 may be electrically connected (e.g., with a copper wire and connector) to an electrometer circuit (not shown). Any particles (e.g., protons) that stray from the particle beam and absorb into the segments 240 create an electrical current in the wire. If the particle beam deviates from a center of the collimator 214, an increased electrical current through at least one of the segments 240 will be detected by the electrometer circuit. Accordingly, an operator of the irradiation system 100 may be alerted to any abnormal behavior by the particle beam.

The systems and methods described herein include several benefits. A first benefit is that the target carrier assembly 200 is reusable. For example, many of the components (e.g., the vacuum window foil 212, the target 206, gaskets, O-rings, etc.) of the target carrier assembly 200 can be removed and replaced using telemanipulators such that the target carrier assembly 200 can be refurbished and subsequently reused in the irradiating of many target materials to produce radioisotopes. The components of the target carrier assembly 200 may be removed and replaced with master-slave manipulators in the hot cell attached to the target station 106. The ability to refurbish the target carrier assembly 200 and replace the components, especially the components that generally require the most maintenance, of the target carrier assembly 200 results in less waste and more efficient radioisotope production processes.

Further, parts of the target carrier assembly 200 that need different levels of radioactive waste disposal can each be disposed of in the corresponding waste level, without the whole target carrier assembly 200 having to be disposed in the highest waste level due to non-removable parts. For example, if the collimator segments 240 are fabricated from an aluminum alloy, radioactive by-products of the particle beam interacting with the collimator 214 and the segments 240 may take years to degrade and therefore need high level nuclear waste disposal, a costly expense. The rest of the target carrier assembly 200 may only need low level nuclear waste disposal, which is not as costly.

Another benefit of the systems and methods described is the collimator 214 being included within the target carrier assembly 200. When the target carrier assembly 200 is removed from the irradiation position and the target station 106, all highly irradiated parts of the irradiation system 100 are removed, and the target station 106 does not have any "hot" components. Accordingly, the target station 106 quickly "cools down," and therefore maintenance can safely be performed on the target station 106 by personnel (e.g., without exposing the personnel to levels of radiation above a threshold safe value) soon after the target 206 in the target carrier assembly 200 is removed from the irradiation position.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A collimator included within a collimator compartment of a target carrier assembly of an irradiation system, the collimator having a beam entry diameter, a beam exit diameter, an inner surface, and an outer surface, wherein the beam entry diameter is greater than the exit diameter forming a narrowing channel disposed to direct a particle beam to irradiate a target included within the target carrier assembly, and wherein the inner surface of the collimator is curved such that an incidence angle between the particle beam and the inner surface of the collimator at the beam entry diameter is greater than an incidence angle between the particle beam and the inner surface of the collimator at the beam exit diameter.

2. The collimator of claim 1, wherein collimator includes at least one electrically insulated segment connected to an electrometer.

3. The collimator of claim 2, wherein the segments of the collimator are removably attached to the collimator compartment with a retaining ring.

4. The collimator of claim 2, wherein the segments are insulated by anodizing.

5. The collimator of claim 1, wherein the collimator is fabricated from at least one of pure aluminum and an aluminum alloy.

6. The collimator of claim 1, wherein the outer surface of the collimator is thermally coupled to the collimator compartment.

7. The collimator of claim 1, wherein the incidence angle between the particle beam and the inner surface of the collimator at the beam entry diameter is greater than 10 degrees and the incidence angle between the particle beam and the inner surface of the collimator at the beam exit diameter is less than 5 degrees.

8. The collimator of claim 7, wherein the incidence angle between the particle beam and the inner surface of the collimator at the beam entry diameter is 11 degrees and the incidence angle between the particle beam and the inner surface of the collimator at the beam exit diameter is 3 degrees.

9. The collimator of claim 1, wherein the collimator includes a beam entry side and a beam exit side, the beam entry diameter being defined at the beam entry side and the beam exit diameter being defined at the beam exit side, wherein the channel directs the particle beam generally along a particle beam axis extending through the beam entry side and the and the beam exit side such that deviation of particles from the particle beam axis generally follow a normal distribution.

10. The collimator of claim 9, wherein the incidence angle at the beam entry diameter is defined between the particle beam axis and the inner surface of the collimator at the beam entry side and the incidence angle at the beam exit diameter is defined between the particle beam axis and the inner surface of the collimator at the beam exit side.

11. The collimator of claim 9, wherein the outer surface of the collimator extends linearly and radially inward from the beam entry side to the beam exit side.

12. The collimator of claim 1, wherein the collimator includes a plurality of electrically insulated segments connected to an electrometer, the segments each being positioned circumferentially about the beam entry diameter.

13. The collimator of claim 1, wherein the inner surface of the collimator is concave.

* * * * *